Patented Dec. 5, 1922.

1,437,952

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF MAKING PLASTIC COMPOSITIONS AND PRODUCTS THEREOF.

No Drawing.     Application filed August 10, 1920. Serial No. 402,605.

*To all whom it may concern:*

Be it known that I, ARTHUR A. BACKHAUS, a citizen of the United States, residing at Baltimore, in the State of Maryland, have invented a certain new and useful Improvement in Processes of Making Plastic Compositions and Products Thereof, of which the following is a specification.

My invention relates particularly to a process of producing compositions containing cellulose derivatives and the products thereof, which products may be used in various industries in the same manner as celluloid.

The object of my invention is to provide a process by means of which plastic compositions may be made of an advantageous character which may be used in the same manner as celluloid in the various arts, but which avoid the necessity of utilizing camphor, a material which is very costly and often difficult to obtain in the desired quantities. Still a further object of my invention is to utilize ethyl aceto acetate as a camphor substitute in such compositions.

Further objects of my invention will appear from the detailed description thereof contained hereinafter.

While my invention is capable of embodiment in many different forms, by way of illustration I shall describe in detail only certain forms of my invention hereinafter.

For example, in carrying out my invention, I may mix together 10 oz. by weight of cellulose nitrate, as for instance pyroxylin, or cellulose acetate, and one gallon of any suitable solvent, such for instance as acetic ether, acetone, methyl acetone, methyl acetate, amyl acetate, ethly alcohol alone, or mixtures thereof, or mixtures of the same with 1 to 10 oz. of any one mixture of any number of the following substances: fusel oil, amyl alcohol, butyl alcohol, butyl acetate. To this composition, there may be added either to the cellulose ester before the addition of the volatile solvents, or after the addition of the same, 1 to 4 oz. by weight of ethyl aceto acetate, $CH_3COCH_2COOC_2H_5$. This may be either one of the following two compounds or a mixture thereof:

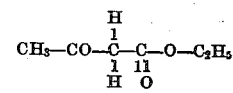

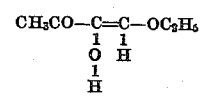

The volatile solvent that is preferred to be used in the above composition is acetic ether.

Instead of the ethyl aceto acetate I may use any other ester of aceto acetic acid as for example the methyl, propyl, butyl esters or methyl ethyl aceto acetate, or ethyl aceto acetate, etc.

Instead of the cellulose esters I may use one or more of the cellulose ethers, for example cellulose methyl ether, cellulose ethyl ether, etc.

The composition thus prepared will be found to be plastic and capable of hardening to form a product having characteristics similar to those of celluloid. In the hardening of this composition the volatile solvent will evaporate until substantially none of the same remains therein, and the composition will then be comprised substantially of the cellulose ester and ethyl aceto acetate. The ethyl aceto acetate, in fact, adds to the composition all of the advantageous properties which follow from the use of camphor in such compositions. The ethyl aceto acetate provides flexibility and pliability to the compositions, obviates brittleness, opacity, and blushing therein.

While I have described my invention above in detail, I wish it to be understood that many changes may be made therein without departing from the spirit thereof.

I claim:

1. A process which comprises forming a plastic composition by adding to pyroxylin ethyl aceto acetate and acetic ether.

2. A process which comprises forming a plastic composition by adding to pyroxylin an ester of aceto acetic acid and acetic ether.

3. A composition containing pyroxylin, ethyl aceto acetate, and acetic ether.

In testimony that I claim the foregoing, I have hereunto set my hand this 8 day of July, 1920.

ARTHUR A. BACKHAUS.